United States Patent  (10) Patent No.: US 7,214,403 B1
Peters  (45) Date of Patent: May 8, 2007

(54) HAM PRODUCT AND METHOD FOR PRODUCTION THEREOF

(75) Inventor: Deanna M. Peters, Alpharetta, GA (US)

(73) Assignee: HBH Limited Partnership, Cincinnati, OH (US)

( * ) Notice: Subject to any disclaimer, the term of this patent is extended or adjusted under 35 U.S.C. 154(b) by 0 days.

(21) Appl. No.: 11/246,159

(22) Filed: Oct. 11, 2005

Related U.S. Application Data

(60) Provisional application No. 60/714,417, filed on Sep. 7, 2005.

(51) Int. Cl.
 A23L 1/31 (2006.01)
(52) U.S. Cl. ..................... 426/641; 426/480
(58) Field of Classification Search ................ 426/480, 426/641, 645; 452/135–140, 160
 See application file for complete search history.

(56) References Cited

U.S. PATENT DOCUMENTS

| 2,470,078 A | 5/1949 | Hoenselaar |
| 2,599,328 A | 6/1952 | Hoenselaar |
| 4,118,777 A | 10/1978 | Wallace ..................... 364/475 |
| 4,170,174 A | 10/1979 | Ditty et al. .................... 99/538 |
| 4,420,997 A | 12/1983 | Whitehouse .................. 83/105 |
| 4,662,029 A | 5/1987 | Helsene et al. |
| 5,030,472 A * | 7/1991 | Logan, Jr. .................... 426/641 |
| 5,108,344 A * | 4/1992 | Debey ......................... 452/135 |
| 5,989,607 A | 11/1999 | Dieso et al. ................. 426/112 |
| 6,168,822 B1 | 1/2001 | Reicks et al. ............... 426/641 |

OTHER PUBLICATIONS

Jerri Stroud, "Brother-Sister Act is Smokin", *St. Louis Post-Dispatch*, Oct. 27, 1997, 3 pgs.
New Product News, Feature—Only the value-added survive, vol. 34, No. 6, Jul. 1998, 2 pgs.

* cited by examiner

*Primary Examiner*—Arthur L. Corbin
(74) *Attorney, Agent, or Firm*—Kilpatrick Stockton LLP (57) ABSTRACT

A ham product and method for production thereof described herein separate bone-in hams into smaller pieces. Accordingly, pieces of bone-in ham, even those spirally-sliced, will be available to consumers in smaller portions. Unlike conventional methods, however, the ham product and method for production does not cut the femur bone longitudinally. As a result, one piece of the bone-in ham has substantially no bones. A method for separating a bone-in ham comprises the steps of providing a first separation through the ham to provide a first portion and a second portion, and providing a second separation through the first portion, wherein only one of the first separation or second separation is through a femur bone.

16 Claims, 11 Drawing Sheets

HAM PRODUCT AND METHOD FOR PRODUCTION THEREOF

CROSS-REFERENCE TO RELATED APPLICATIONS

This application claims priority to U.S. Provisional Patent Application No. 60/714,417, filed Sep. 7, 2005, entitled HAM PRODUCT AND METHOD FOR PRODUCTION THEREOF, which is hereby incorporated by reference in its entirety.

BACKGROUND OF THE INVENTION

1. Field of the Invention

The field of the invention relates to a ham product and method for production thereof and, more specifically, to separating a bone-in ham into smaller pieces.

2. Description of the Related Art

Spirally-sliced ham products are popular with consumers, largely because of the convenience of being able to easily remove the pre-sliced ham pieces from the product. A spirally-sliced bone-in ham is produced by slicing it in a manner to form a continuous spiral cut around a centrally-located bone, e.g, a femur bone. Thus, the meat remains substantially connected to the bone such that the spirally-sliced ham remains intact and can be handled and packaged without pieces falling off, folding over, and otherwise deforming. As a result, the consumer decides when to detach the slices from the bone.

It has been recognized that many consumers are hesitant to purchase an entire bone-in ham because there is more meat than the consumer can conveniently consume. As a result, spirally-sliced bone-in hams are commonly sold at retail in half portions. In a conventional method for producing ham portions, the full bone-in ham is cut transversely through a femur bone in order to cut the product into a butt half, which includes the butt end, and a shank half, which includes the shank tip. The butt half includes an aitch bone and part of the femur bone. The shank half includes a shank bone and the remainder of the femur bone. Both the butt half and the shank half are commercially appealing in that only the ends of the femur are visible and the product is not unsightly. The meat remains continuously attached to the bone, so slices are not prone to falling off or becoming deformed during subsequent handling or packaging.

Although spirally-sliced bone-in ham products of this type have been well received, the amount of meat they contain can still be excessive for consumers and smaller occasions where the product is consumed by only a relatively small number of people. Consequently, there is the need to cut spirally-sliced bone-in hams into smaller products in order to allow consumers the option of purchasing a smaller amount of meat.

Additionally, as the size of hogs has increased, a bone-in ham is likely to be larger. A consumer does not have as much of a need for such a large bone-in ham. Moreover, family size has been decreasing. Accordingly, families do not desire as much bone-in ham. And as prices of pork products increase, consumers desire a lower priced product, which will likely correlate directly with the product weight.

U.S. Pat. No. 5,989,607 ("the '607 patent") to Dieso discloses a ham product that is formed by cutting a spirally-sliced half-ham longitudinally through the bone. The cut can be made by feeding the half-ham through a band saw blade by hand, by pushing a split cart through the blade, or by feeding the product through the blade on a split belt conveyor. Whatever method is used involves aligning the femur with the saw blade so that the femur is cut longitudinally and the meat remains attached to the bone around approximately half of its original circumference. Each half ham is cut transversely into a pair of substantially mirror image products that are each approximately one-fourth of the full ham. Even though the resulting one-fourth ham product is somewhat delicate, the slices remain attached to the bone securely enough to stay intact so that handling and packaging can be carried out in a commercially acceptable manner.

The method in the '607 patent presents some issues with regards to handling and packaging, especially with regards to the corner area of the bone at the intersection between the transverse and longitudinal cuts. The sharp corners of the cut femur bone provide a danger to the handler, packager, and the consumer. As a result, the '607 patent provides packaging to accommodate for the sharp edges. For example, where the sharp corner area of the bone fits into the packaging, a series of cushioning dimples are extruded at the edge of the packaging to pad the bone. With the assistance of the cushioning dimple padding, vacuum packaging can be applied. Alternatively, a folded flap is needed to form a double thickness of material that is able to resist puncturing of the tray. Further, this method of quartering a bone-in ham can result in an unsightly bone segment in every quarter of the bone-in ham.

SUMMARY OF THE INVENTION

What is desired is a product and a method for production thereof for separating a bone-in ham into smaller pieces. The desired method does not leave sharp corners of a bone exposed. Further, the desired method limits the amount of cutting through a bone, which can decrease costs as well as can increase efficiency and safety. Moreover, the desired method can separate the bone-in ham to provide a substantially boneless piece.

A ham product and method for production thereof described herein separate bone-in hams into smaller pieces. Accordingly, pieces of bone-in ham, even those spirally-sliced, can be cut into smaller products according to the method described herein. Unlike conventional methods, however, the ham product and method for production does not cut the femur bone longitudinally. As a result, one piece of the bone-in ham can have substantially no bones.

In one embodiment, a method for separating a bone-in ham comprises the steps of firstly separating the bone-in ham into provide a first portion and a second portion. Secondly, the first portion is separated into a first piece and a second piece. Only one of the first separation or second separation is through a femur bone.

In another embodiment, a ham product is made by the process comprising the steps of providing a first separation through the ham to provide a first portion and a second portion. A second separation is provided through the first portion such that only one of the first separation or second separation is through a femur bone.

In yet another embodiment, a ham product comprises a first portion and a second portion. The first portion comprises a first component and a second component. The first component comprises a segment of a femur bone. The second portion comprises a third component and a fourth component. The third component comprises substantially no bone.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The present invention will be more clearly understood from a reading of the following description in conjunction with the accompanying exemplary figures wherein.

DETAILED DESCRIPTION OF THE PREFERRED EMBODIMENTS

Reference will now be made in detail to the preferred embodiments of the present invention, examples of which are illustrated in the accompanying drawings.

Figure 1A:
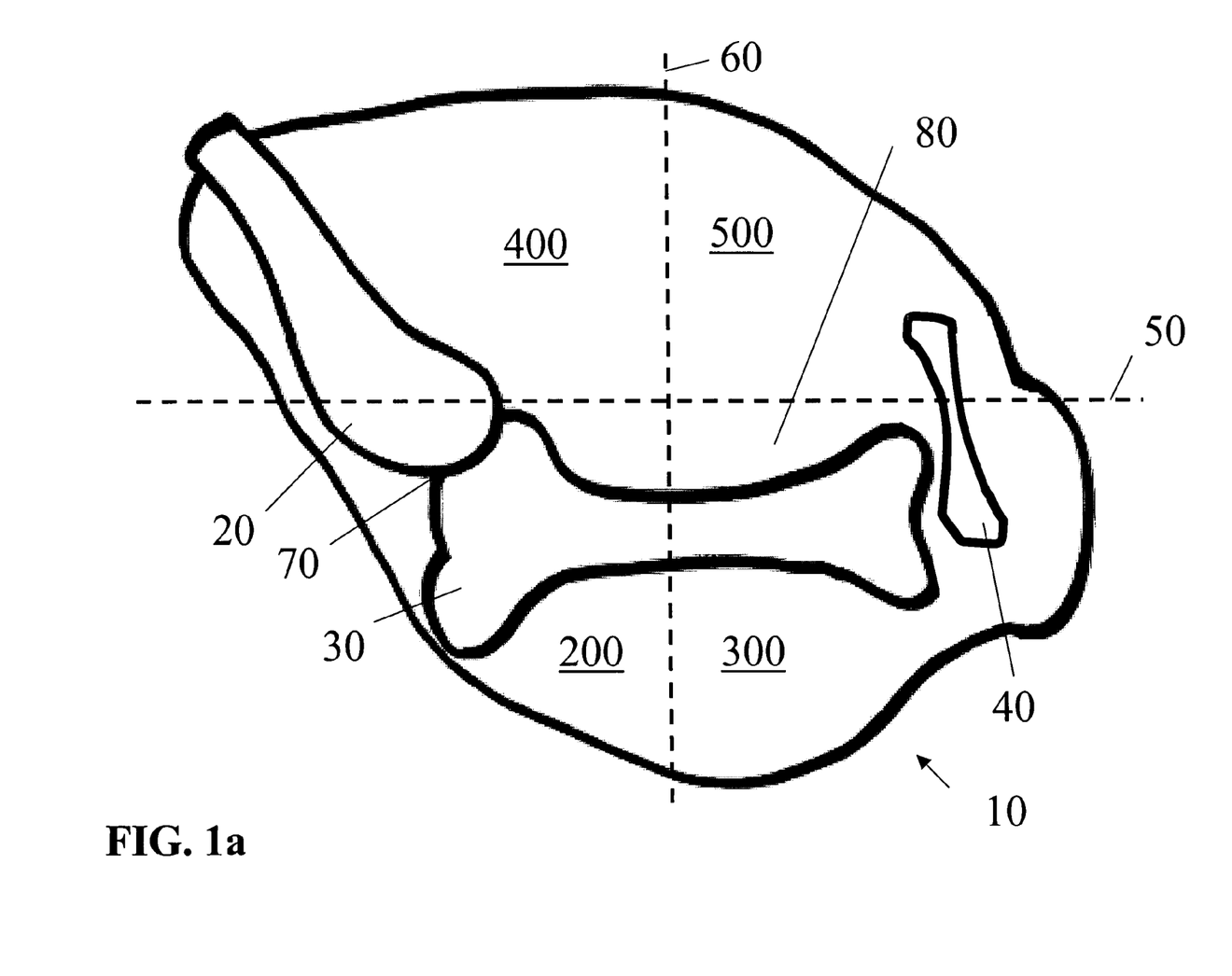
FIG. 1a shows a cross-sectional view of a bone-in ham according to an exemplary embodiment of the present invention.

Referring to FIG. 1a, a cross-sectional view of a bone-in ham 10 is shown according to an embodiment of the present invention. A person of ordinary skill in the art recognizes that the bone-in ham 10 is not drawn to scale and may have any configuration of the bones contained therein, as known to one of ordinary skill in the art. Bone-in ham 10 typically comprises three bones: a shank bone 20, a femur bone 30, and an aitch bone 40. The shank bone 20 extends substantially from a shank tip of the bone-in ham 10 to the femur bone 30, which is positioned at a different angle from the shank bone 20. At the other end, i.e., the butt end of the bone-in ham 10, the femur bone 30 is proximate to the aitch bone 40.

The aitch bone 40 is positioned substantially at the end of the bone-in ham 10. When separating the bone-in ham 10 into smaller pieces, the aitch bone 40 may be separated into pieces or, alternatively, removed altogether. In an exemplary embodiment, the aitch bone 40 can be removed before any separation into smaller pieces. In another exemplary embodiment, the aitch bone 40 is removed from a smaller piece of the bone-in ham 10.

Figure 1B:
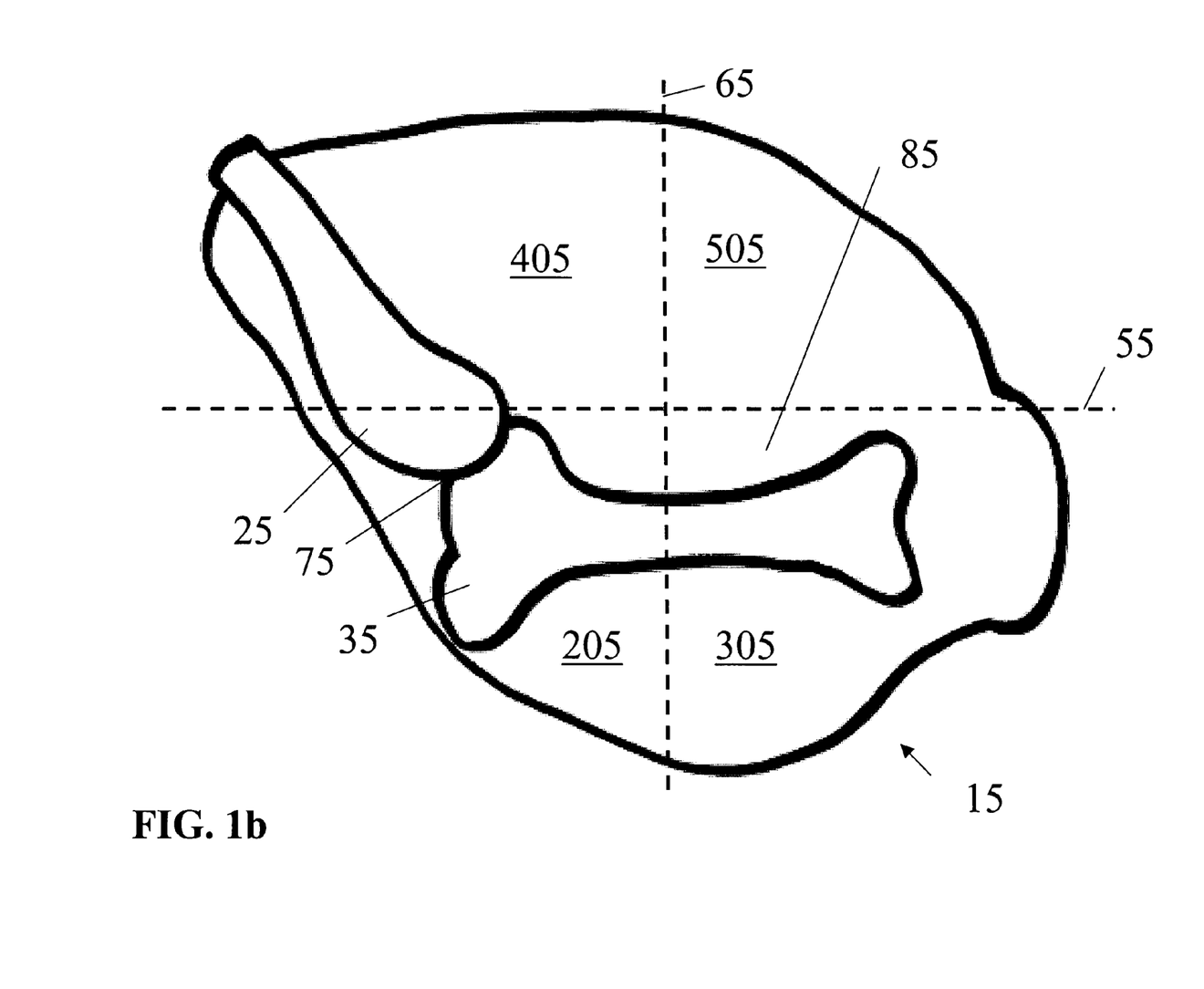
FIG. 1b shows a cross-sectional view of a bone-in ham according to an exemplary embodiment of the present invention.

Referring to FIG. 1b, a cross-sectional view of a bone-in ham 15 is shown according to another exemplary embodiment of the present invention. A person of ordinary skill in the art recognizes that the bone-in ham 15 is not drawn to scale and may have any configuration of the bones contained therein, as known to one of ordinary skill in the art. In this exemplary embodiment, an aitch bone has been removed from bone-in ham 15. Thus, bone-in ham 15 comprises a shank bone 25 and a femur bone 35.

In an exemplary embodiment, the bone-in ham 10, 15 is spirally-sliced substantially about the femur bone 30, 35. Methods for spiral-slicing bone-in hams are known to one of ordinary skill in the art. For example, the bone-in ham 10, 15 can be spirally-sliced according to the methods disclosed in U.S. Pat. Nos. 2,470,078 and 2,599,328 to Hoenselaar, which are hereby incorporated by reference in their entirety. The spiral-sliced meat of the bone-in ham 10, 15 can extend up to the femur bone 30, 35, substantially near the femur bone 30, 35, or any distance from the femur bone 30, 35. The spiral slicing can extend from one end of the bone-in ham 10, 15 to the other end, or any variation of length and configuration therebetween.

Figure 8:
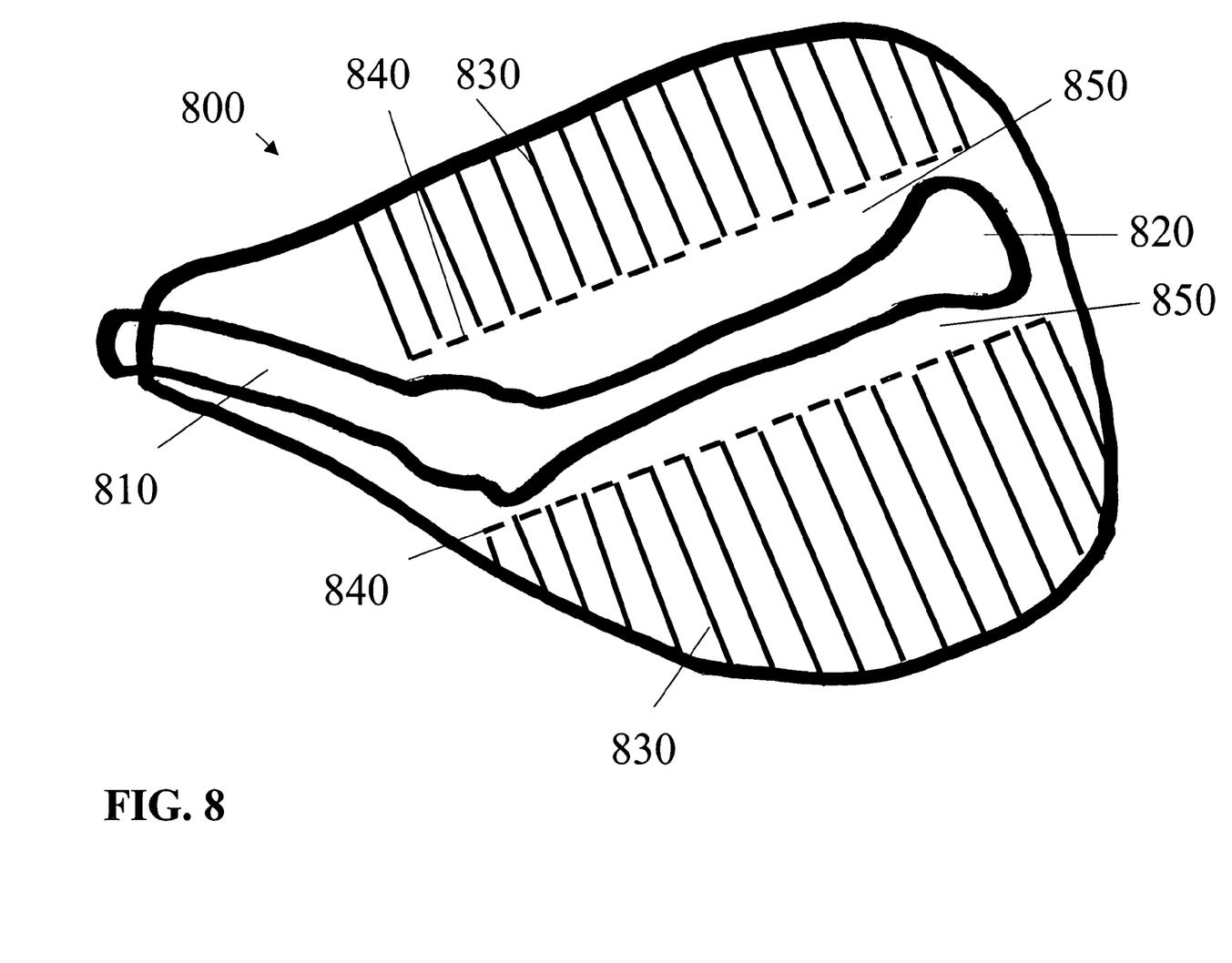
FIG. 8 shows a cross-sectional view of a bone-in ham according to an exemplary embodiment of the present invention.

The bone-in ham 10, 15 can be spiral-sliced about any size portion of unsliced ham substantially enveloping the femur bone 30, 35, as described below. Referring to FIG. 8, a cross-sectional view of a spirally-sliced bone-in ham 800 is shown. In this exemplary embodiment, an aitch bone (not shown) has been removed. The bone-in ham 800 has a shank bone 810 and a femur bone 820. The bone-in ham 800 has been spirally-sliced 830 substantially the length of the bone-in ham 800 and substantially centered about the femur bone 820. An edge 840 represents the extent of the spiral-slicing 830 towards the femur bone 820. Because the spiral-slicing is not substantially against the femur bone 820, an unsliced portion of ham 850 remains substantially between the femur bone 820 and the spiral-slicing 830. One of ordinary skill in the art recognizes that the irregular-shaped femur bone 820 is substantially encased in an unsliced portion 850 around the femur bone 820.

In order to separate the bone-in ham 10, 15 into a plurality of pieces or components, a first separation must be made. Referring back to FIGS. 1a and 1b, a longitudinal plane 50, 55 extends substantially along the general direction of the femur bone 30, 35. The longitudinal plane 50, 55 can extend adjacent to an edge of the femur bone 30, 35. Alternatively, the longitudinal plane 50, 55 can extend along a line such that a portion of meat 80, 85 of the bone-in ham 10, 15 is substantially between the longitudinal plane 50, 55 and the femur bone 30, 35. In FIGS. 1a and 1b, the longitudinal plane 50, 55 is shown with meat 80, 85 between the longitudinal plane 50, 55 and the femur bone 30, 35. In a preferred embodiment, the longitudinal plane 50, 55 extends substantially through a joint 70, 75 between shank bone 20, 25 and femur bone 30, 35. When the longitudinal plane 50, 55 extends through the joint 70, 75, it can be easier to separate the shank bone 20, 25 from the femur bone 30, 35. Additionally, the longitudinal plane 50, 55 extending substantially through the joint 70, 75 typically provides the portion of meat 80, 85 between the femur bone 30, 35 and the longitudinal plane 50, 55.

The longitudinal plane 50, 55 does not correspond to the spiral-slicing of the bone-in ham 10, 15. The longitudinal plane 50, 55 can intersect an unsliced portion of meat around the femur bone 30, 35. In an alternative embodiment, the longitudinal plane 50, 55 does not pass through the unsliced portion of meat at all. Referring to FIGS. 1a, 1b, and 8, the longitudinal plane 50, 55 can be positioned substantially in unsliced meat 850, substantially on edge 840, or somewhere within the spiral-sliced meat 830.

Referring to FIG. 1a, the bone-in ham 10 divided substantially along the longitudinal plane 50 has a first half substantially comprising a segment of the shank bone 20. The first half can also comprise a segment of the aitch bone 40. A second half substantially comprises the femur bone 30 and a segment of the shank bone 20. The second half can comprise a segment of the aitch bone 40.

Referring to FIG. 1b, the bone-in ham 15 divided substantially along the longitudinal plane 55 has a first half substantially comprising a segment of the shank bone 25. A second half substantially comprises the femur bone 35 and a segment of the shank bone 25. Bone-in ham 15 does not have an aitch bone, thus the resulting halves do not comprise a segment of the aitch bone.

In both FIGS. 1a and 1b, a transverse plane 60, 65 extends substantially perpendicular to the longitudinal plane 50, 55. The transverse plane 60, 65 extends through the bone-in ham 10, 15 at about an approximately center plane of the bone-in ham 10, 15. In a preferred embodiment, the transverse plane 60, 65 extends only through the femur bone 30, 35 not the shank bone 20, 25 nor the aitch bone 40.

The transverse plane 60, 65 is a conventional separation location for separating the bone-in ham 10, 15 in two halves. The bone-in ham 10, 15 divided substantially by the transverse plane 60, 65 has a first half comprising the shank bone 20, 25 and a segment of the femur bone 30, 35. This first half is commonly referred to as a "shank" ham. A second half comprises the remainder of the femur bone 30, 35. When separating the bone-in ham 10, along transverse plane 60, the second half also comprises the aitch bone 40. The second half, with or without the aitch bone, is commonly referred to as a "rump" or "butt" ham.

In producing smaller sections of the bone-in ham 10, 15, a first separation is performed either along the longitudinal plane 50, 55 or the transverse plane 60, 65, as described above, thereby forming a first portion and a second portion. In order to further separate or quarter the bone-in ham 10, 15, a second separation is performed along the other plane. In one exemplary embodiment, the first separation is along the longitudinal plane 50, 55. Accordingly, the second separation is along the transverse plane 60, 65 extending through each portion. In a second exemplary embodiment, the first separation is along the transverse plane 60, 65. Accordingly, the second separation is along the longitudinal plane 50, 55 extending through each portion.

The second separation separates the first portion into two pieces. It is not necessary to further separate the second portion into two pieces. However, in order to substantially quarter the bone-in ham 10, 15, a third separation separates the second portion, thereby resulting in four pieces, i.e., "quarters," of the bone-in ham 10, 15.

In an exemplary embodiment, a product is made by the process of a first separation substantially along the longitudinal plane, thereby forming a first half and a second half. A second separation substantially along the transverse plane through the first half forms a first quarter and a second quarter. A third separation through the second half forms a third quarter and a fourth quarter.

Although this description uses the term "quarter," it is not intended to be limited to an exact quarter portion of a bone-in ham. In fact, the term is used to reflect that an approximate half of a bone-in ham has been further separated in approximately half. If each approximate half were separated substantially in half, then four substantial quarters are produced.

Referring to the exemplary embodiment in FIG. 1a, the four quarters resulting from the process are as follows. A first quarter 200 comprises a segment of the femur bone 30 and a segment of the shank bone 20. A second quarter 300 comprises a segment of the femur bone 30 and can also comprise a segment of the aitch bone 40. A third quarter 400 comprises a segment of the shank bone 20. A fourth quarter 500 can comprise a segment of the aitch bone 40.

Referring to the exemplary embodiment in FIG. 1b, the four quarters resulting from the process are as follows. A first quarter 205 comprises a segment of the femur bone 35 and a segment of the shank bone 25. A second quarter 305 comprises a segment of the femur bone 35. A third quarter 405 comprises a segment of the shank bone 25. A fourth quarter 505 comprises no bones.

When the bone-in ham is spirally sliced, it is desirable for the fourth quarter 505 to have substantially no bones or, alternatively in the exemplary embodiment in FIG. 1b, the presence of only a segment of the aitch bone 40 in fourth quarter 500. If the fourth quarter 500 has a segment of the aitch bone 40, the end portion of meat comprising the aitch bone 40 can be removed such that the fourth quarter 500 comprises no bones.

In a conventional method, it is desirable to retain a segment of a bone in each portion of the ham. As a result, each quarter or portion of the bone-in ham has spirally-sliced meat substantially attached to a bone segment. Typically, the bone segment is located at a corner or edge of each quarter of the ham. The location of the bone segment in each quarter or portion can provide support for the sliced meat attached thereto.

In exemplary embodiments of the present invention, however, one quarter or portion of the separated bone-in ham does not have a bone segment connected to every slice of spirally-sliced ham. In another exemplary embodiment, this quarter or portion of the meat can be connected by a portion of unsliced meat.

In another distinction, those quarters or portions having bone segments, according to the preferred embodiment, have the bone segment situated internally in the quarter or portion. Each quarter or portion having a bone exposes the bone only along a substantially flat surface on its sides. The bone is not situated externally, which can cause a sharp edge or an unsightly product.

Figure 2:
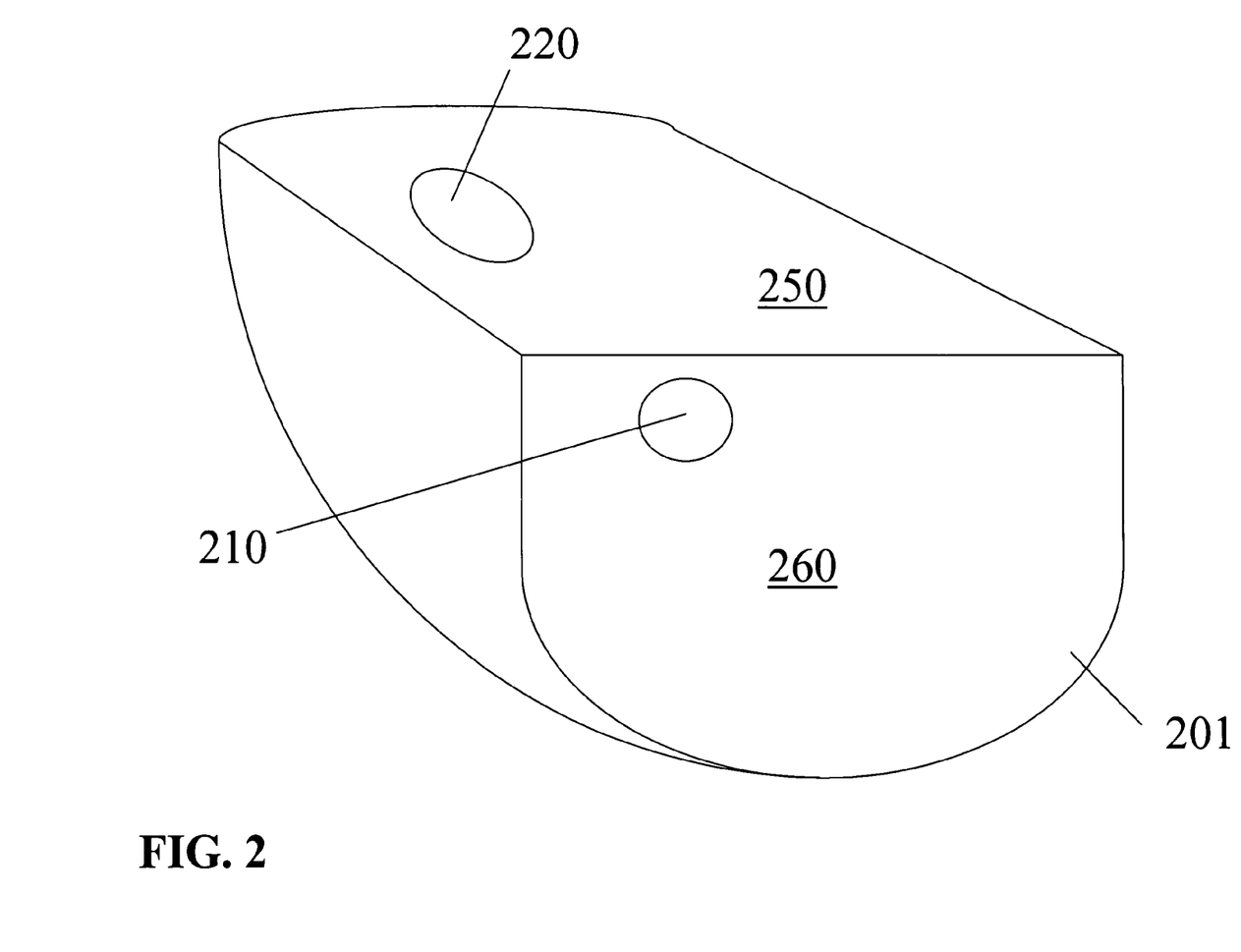
FIG. 2 shows a perspective view of a quarter of a bone-in ham according to an exemplary embodiment of the present invention.

FIGS. 2–5 show a bone-in ham substantially divided into substantially four quarters separated by the process described above with respect to FIGS. 1a and 1b. Although FIGS. 2–5 show quarters of a bone-in ham, these quarters are merely exemplary and are not illustrative of the only embodiment of a sectioned bone-in ham. Referring to FIG. 2, a perspective view of a first quarter 201 of a bone-in ham is shown. The first quarter 201 comprises a segment of a femur bone 210 and a segment of a shank bone 220. A separation in the bone-in ham along the longitudinal plane 50 produces a side 250, which exposes the shank bone 220. A separation in the bone-in ham along the transverse plane 60 produces a side 260, which exposes the femur bone 210.

Figure 3:
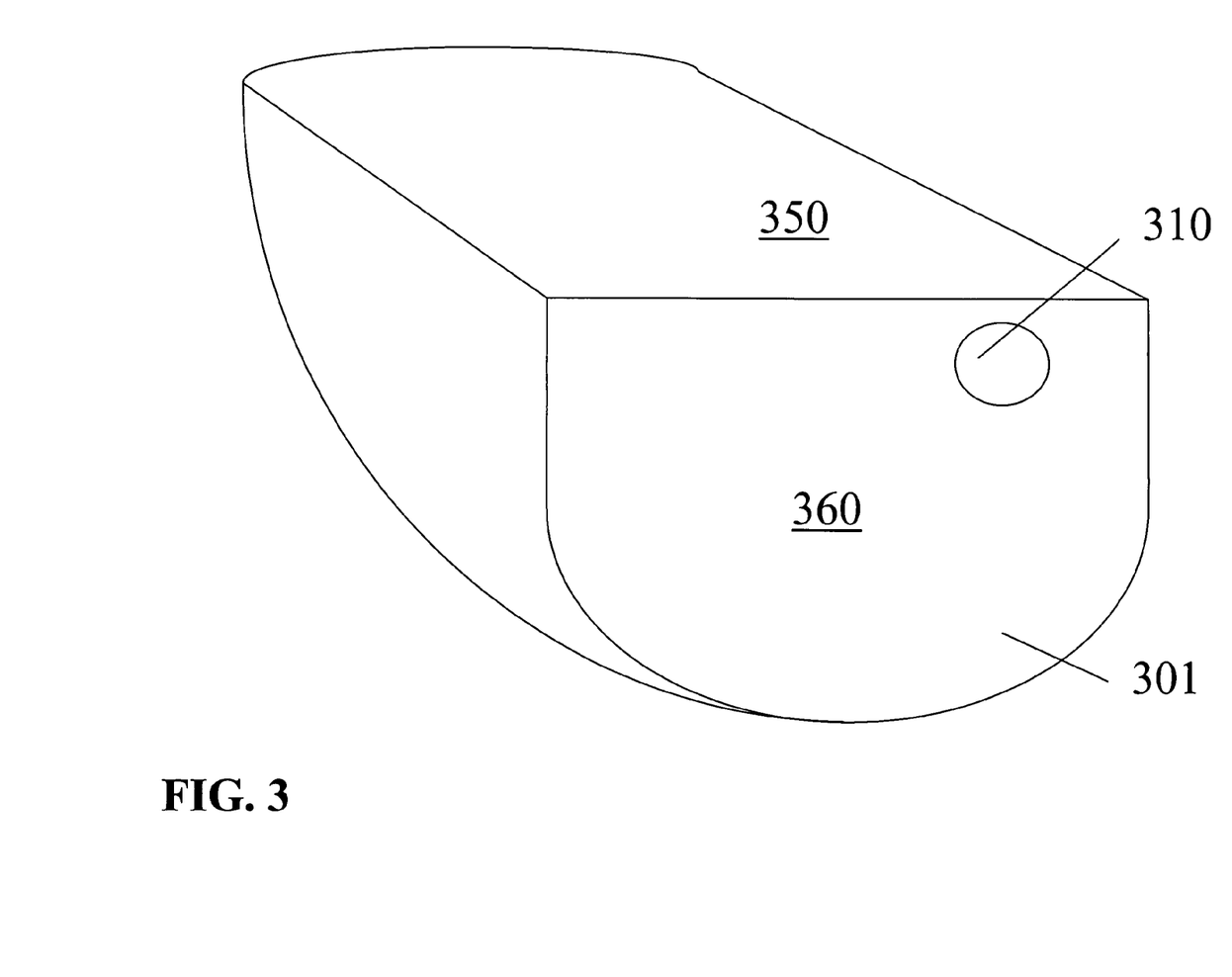
FIG. 3 shows a perspective view of a quarter of a bone-in ham according to an exemplary embodiment of the present invention.

Referring to FIG. 3, a perspective view of a second quarter 301 of a bone-in ham is shown. The second quarter 300 comprises a segment of a femur bone 310. A separation in the bone-in ham along the longitudinal plane 50 produces a side 350. A separation in the bone-in ham along the transverse plane 60 produces a side 360, which exposes the femur bone 310. The separation along the transverse plane 60 separates side 260 from side 360. If the bone-in ham comprises an aitch bone, the second quarter 301 may have a segment of the aitch bone (not shown). In such an instance, the segment would be exposed on side 350.

Figure 4:
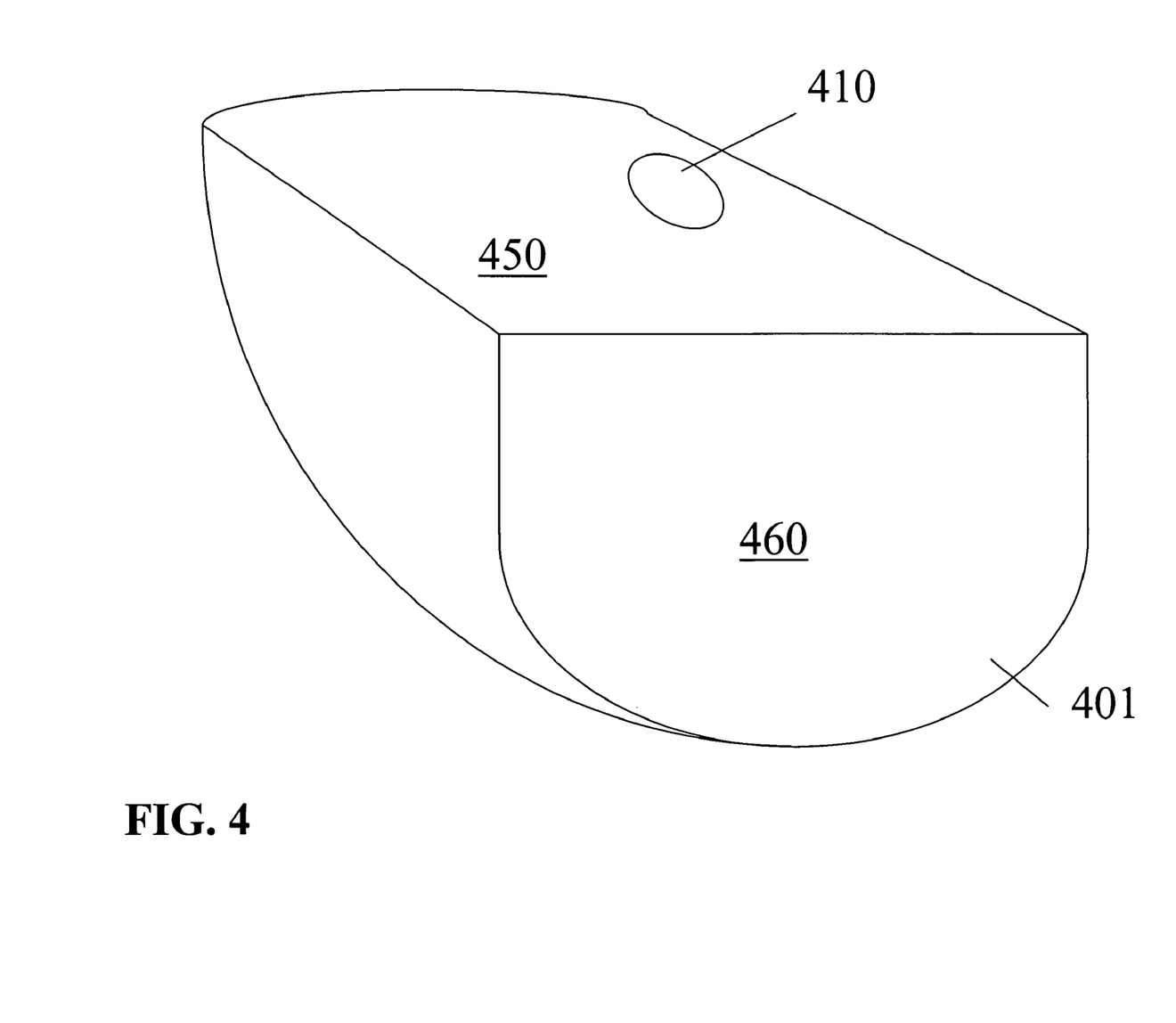
FIG. 4 shows a perspective view of a quarter of a bone-in ham according to an exemplary embodiment of the present invention.

Referring to FIG. 4, a perspective view of a third quarter 401 of a bone-in ham is shown. The third quarter 401 comprises a segment of a shank bone 410. A separation in the bone-in ham along the longitudinal plane 50 produces a side 450, which exposes the shank bone 410. The separation along the longitudinal plane 50 separates side 450 from side 250. The separation in the bone-in ham along the transverse plane 60 produces a side 460.

Figure 5:
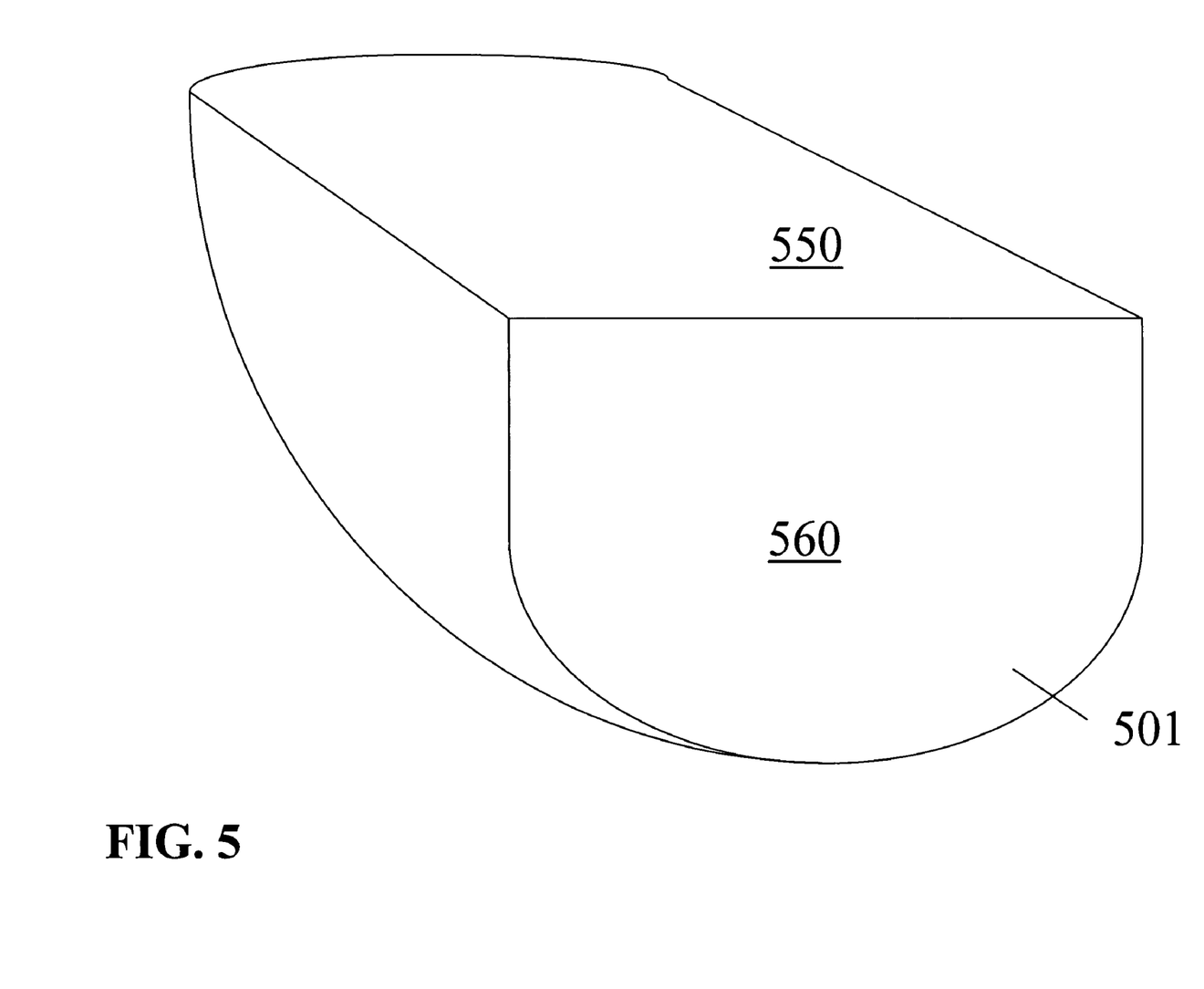
FIG. 5 shows a perspective view of a quarter of a bone-in ham according to an exemplary embodiment of the present invention.

Referring to FIG. 5, a perspective view of a fourth quarter 501 of a bone-in ham is shown. A separation in the bone-in ham along the longitudinal plane 50 produces a side 550. The separation along the longitudinal plane 50 separates side 350 from side 550. A separation in the bone-in ham along the transverse plane 60 produces a side 560. The separation along the transverse plane 60 separates side 450 from side 550. The fourth quarter 501 comprises substantially no bones. If the bone-in ham comprises an aitch bone, then the fourth quarter 501 can comprise a segment of the aitch bone (not shown). The segment of the aitch bone would be exposed on side 550.

Referring back to FIGS. 1a and 1b, the fourth quarter 500, 505 has no bone to retain each slice. As a result, the slices can shift or part from the original form of the fourth quarter 500, 505. Glazing the ham or inserting one or more skewers can assist in retaining the shape of the fourth quarter 500, 505.

In another exemplary embodiment, if the bone-in ham 10, 15 is spirally-sliced to provide an unsliced portion of meat about the femur bone, the bone-in ham 10, 15 can be quartered such that the fourth quarter 500, 505 has a segment of the unsliced portion. As a result, the fourth quarter 500, 505 can have an unsliced portion that is substantially attached to substantially each piece of spirally-sliced ham. When the unsliced portion is present on the fourth quarter 500, 505, the slices of the fourth quarter 500, 505 are supported similarly to those having a bone segment.

The methods described herein produce the fourth quarter 500, 505, which is commercially desirable. While the conventional methods cut a bone-in ham into pieces each having a bone segment, the methods herein provide a method for separating the bone-in ham such that one piece, e.g, the fourth quarter 505, has no bones. Alternatively, the fourth quarter 500 can have a segment of an aitch bone, which can optionally be removed. As a result, separating the slices from the fourth quarter 500, 505 does not require separating from a bone. In fact, in some embodiments having a more fragile fourth quarter 500, 505, the fourth quarter 500, 505 requires almost no further separation of a slice, as the slices may only be substantially connected by a glaze or moisture between slices. Additionally, the fourth quarter 500, 505 without an aitch bone may be more visually appealing product than one having a bone segment or a bone segment along an edge of the quarter, as the consumer does not need to look at a cross-section of a bone or look at an exposed bone of a partially consumed product. The consumer also does not need to handle a bone segment or related waste when done consuming the product.

Each quarter of the bone-in ham, according to the exemplary embodiments described herein, provide for safer handling. The bone segments of conventional methods may result in a sharp edge, which requires different packaging and handling needs. By not having a bone segment in the fourth quarter 505 and optionally in fourth quarter 500, there are no sharp edges of bone, which can cause safety or packaging issues. Moreover, this method can save time and money, as the femur bone is only separated once, not twice. Thus, separations through meat only can be faster than those separations that must traverse bone. Additionally, separation equipment, e.g., saw blades, do not have to be replaced as often for separating bones due to the dulling of the blade from cutting through a bone. By avoiding the femur bone on one of the first or second separations, the fourth quarter 500, 505 therefore allows for a more commercially appealing product.

In another exemplary embodiment, further separation of the fourth quarter 500, 505 can also be desirable. The fourth quarter 500, 505 can be sectioned substantially along the slices. As a result, the sections of the fourth quarter 500, 505 can be packaged in a manner similar to a deli ham product. In a quarter that has a bone segment, however, such packaging is not possible and simple separations are not as feasible.

In alternative embodiments, the position of the longitudinal plane and the transverse plane are varied. These alternative embodiments can be carried out with a bone-in ham having an aitch bone or with the aitch bone removed. In the exemplary embodiments of FIGS. 6 and 7, an aitch bone is shown but can be optionally removed.

Figure 6:
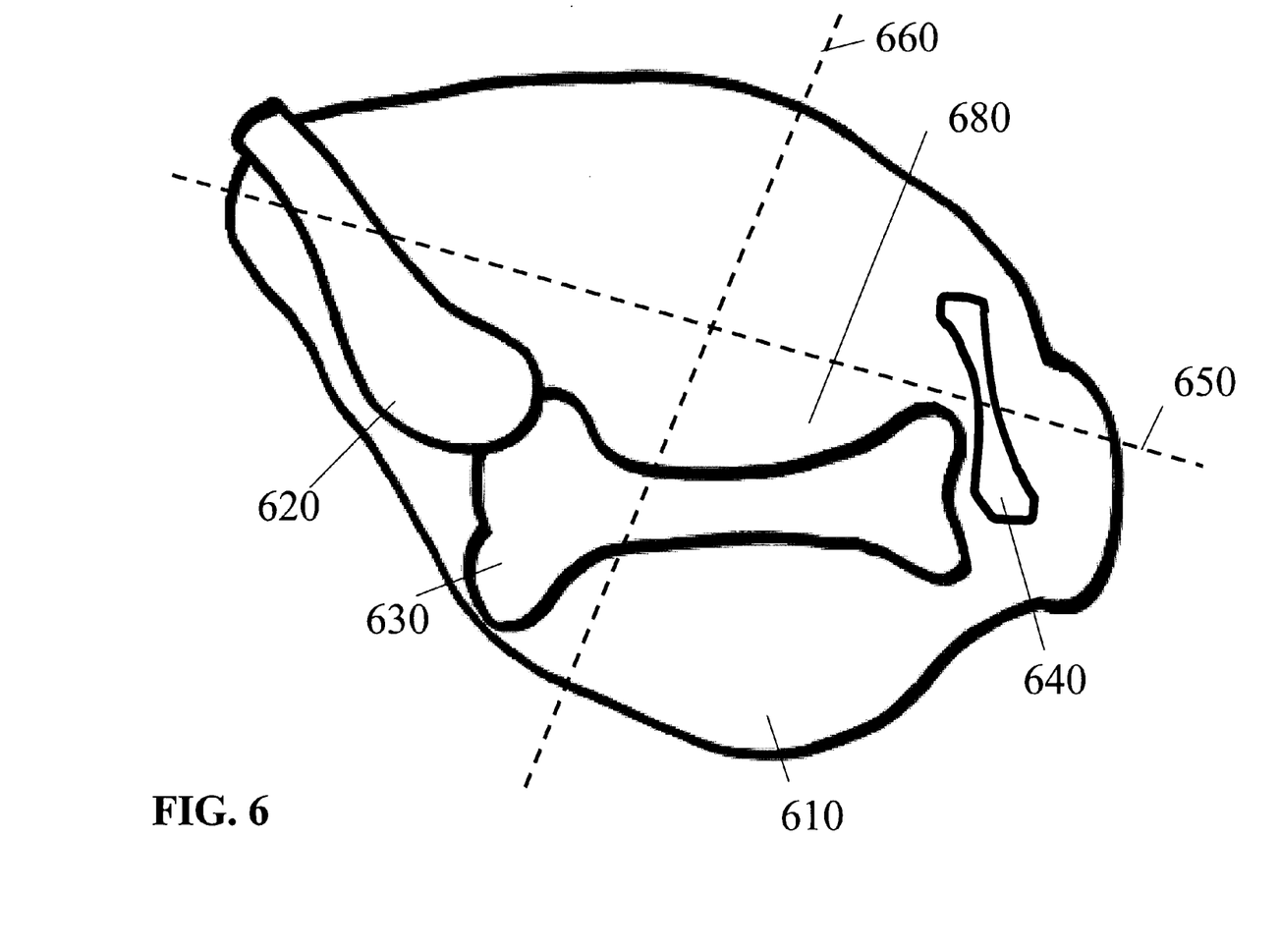
FIG. 6 shows a cross-sectional view of a bone-in ham according to an exemplary embodiment of the present invention.

Referring to FIG. 6, a cross-sectional view of a bone-in ham 610 is shown. In this exemplary embodiment, a longitudinal plane 650 extends substantially from a shank tip of the bone-in ham 610 having a shank bone 620 to a butt end of the bone-in ham having an aitch bone 640. Accordingly, the longitudinal plane 650 is not necessarily substantially aligned with a femur bone 630. However, the positioning of the longitudinal plane 650 still results in a section of meat 680 between the longitudinal plane 650 and the femur bone 630. Thus, the longitudinal plane 650 extends from the shank tip of the bone-in ham 610 through the shank bone 620 and through the aitch bone 640. A transverse plane 660, substantially perpendicular to the longitudinal plane 650, extends substantially through the femur bone 630.

Figure 7:
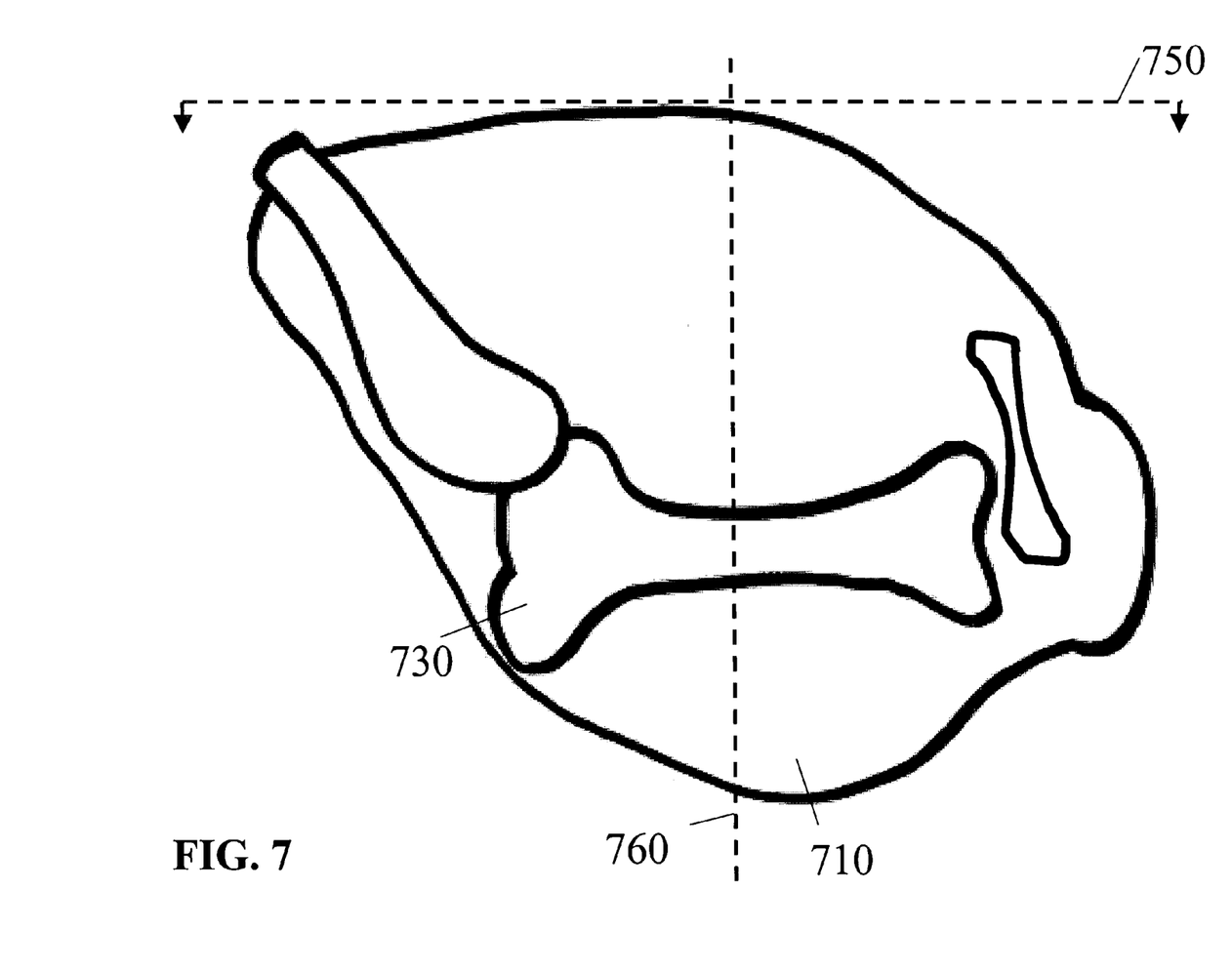
FIG. 7 shows a cross-sectional view of a bone-in ham according to an exemplary embodiment of the present invention.

Referring to FIG. 7, in another alternative embodiment, a cross-sectional view of a bone-in ham 710 is shown. A longitudinal plane extends along a cross-sectional line 750. It is preferable, however, that the longitudinal plane does not extend through a femur bone 730. The longitudinal plane can be along the femur bone 730 or substantially proximate to the femur bone 730, thereby providing a small section of meat therebetween. A transverse plane 760, substantially perpendicular to the longitudinal plane, extends substantially through the femur bone 730.

Separating portions of the bone-in ham along the longitudinal or transverse planes can be accomplished by any means known to one of ordinary skill in the art. Preferably, separating is performed by cutting with a serrated instrument. The bone-in ham can be cut with a knife, saw, bandsaw, table saw, blade, or other cutting instruments. Cutting through a bone can require a different cutting instrument.

Figure 9:
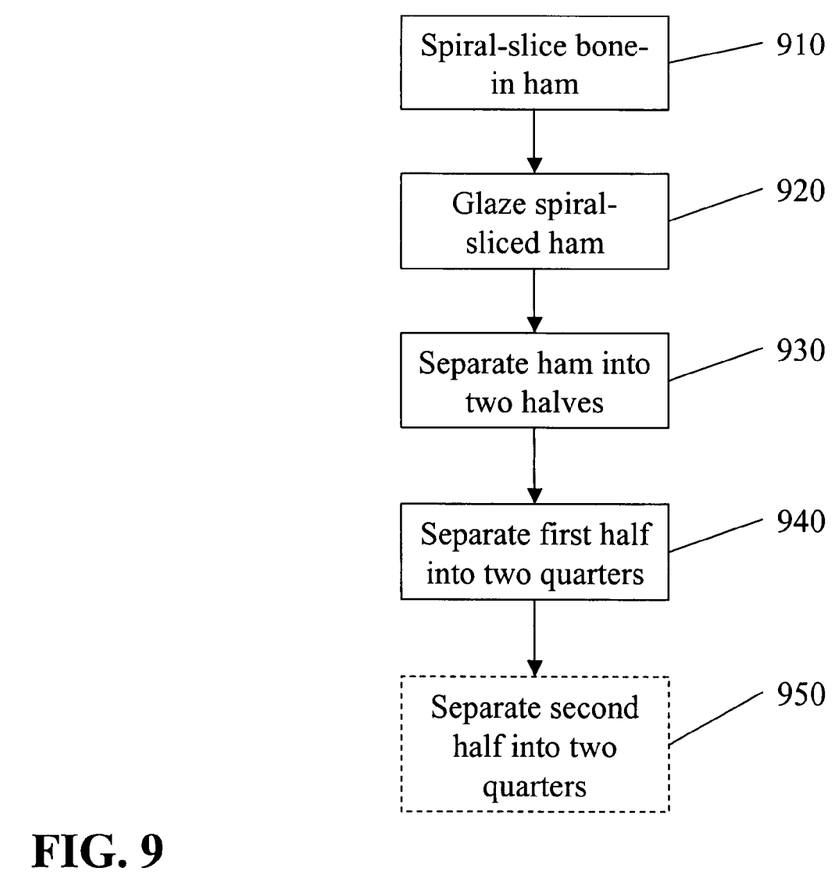
FIG. 9 shows a method for preparing portions of a bone-in ham according to an exemplary embodiment of the present invention.

Preparing a bone-in ham with glaze can be accomplished by various methods. Referring to FIG. 9, an exemplary embodiment for a method for preparing portions of a bone-in ham is shown. A bone-in ham is spirally-sliced 910. The spirally-sliced bone-in ham is then glazed 920. The glazed, spirally-sliced bone-in ham is then separated 930 into two halves. The first half is then separated 940 into two halves, i.e., quarters of the bone-in ham. Optionally, the second half may be separated 950 into halves, i.e., quarters of the bone-in ham. As a result, the glazed quarter may contain glaze on only a portion of an outer surface.

Figure 10:
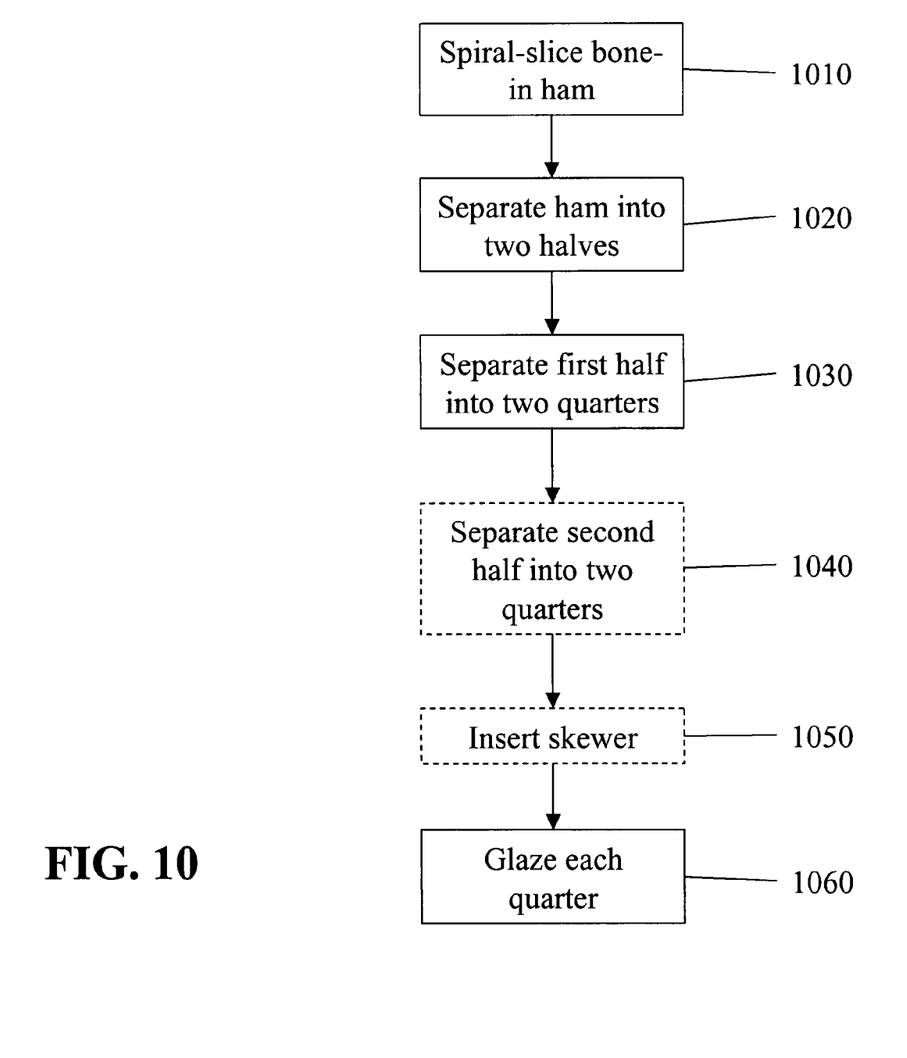
FIG. 10 shows a method for preparing portions of a bone-in ham according to an exemplary embodiment of the present invention.

Referring to FIG. 10, another exemplary embodiment for a method for preparing portions of a bone-in ham is shown. A bone-in ham is spirally-sliced 1010. The spirally-sliced bone-in ham is separated 1020 into two halves. The first half is then separated 1030 into halves, i.e., quarters of the bone-in ham. Optionally, the second half may be separated 1040 into halves, i.e., quarters of the bone-in ham. Alternatively, the halves of the bone-in ham can be halved after glazing. In another optional step, a skewer may be temporarily inserted 1050 to maintain the slices in an upright position or substantially intact during glazing. Each quarter or half of the bone-in ham can then be glazed 1060. As a result, the sides of the quarter may receive some glaze. Additionally, the slices of the quarter pieces may be more fragile, in which the use of one or more skewers can be desirable.

The embodiments described above are intended to be exemplary. One skilled in the art recognizes that numerous alternative components and embodiments that may be substituted for the particular examples described herein and still fall within the scope of the invention.

What is claimed is:

1. A method for separating a spirally-sliced bone-in ham, the method comprising the steps of:
   firstly separating the bone-in ham into a first portion and a second portion; and
   secondly separating the first portion into a first piece and a second piece;
   wherein only one of the first separation or second separation is through a femur bone.

2. The method of claim 1, wherein the first portion comprises substantially the entire femur bone.

3. The method of claim 1, wherein the first piece comprises a segment of the femur bone and the second piece comprises a segment of a shank bone.

4. The method of claim 1, further comprising the step of thirdly separating the second portion into a third piece and a fourth piece.

5. The method of claim 4, wherein the third separation separates the second portion into a first component and a second component, further wherein the first component substantially comprises no bone.

6. The method of claim 5, wherein the second component comprises a segment of a shank bone.

7. The method of claim 1, further comprising the step of removing a portion of an aitch bone.

8. The method of claim 1, wherein the step of providing a first or second separation comprises cutting the bone-in ham using a device selected from the group consisting of a knife, a saw, a bandsaw, a table saw, and a blade.

9. The method of claim 1, wherein the first separation is along a transverse plane through the femur bone.

10. The method of claim 1, wherein the first portion comprises substantially an entire shank bone.

11. The method of claim 1, wherein the first piece comprises a segment of the femur bone and a shank bone and the second piece comprises a segment of a shank bone.

12. The method of claim 1, wherein the first piece comprises a segment of the femur bone and the second piece comprises substantially no bone.

13. The method of claim 12, further comprising the step of glazing the second piece.

14. The method of claim 12, further comprising the step of inserting at least one skewer into the second piece.

15. The method of claim 1, wherein the first separation is substantially along the edge of the femur bone.

16. The method of claim 1, wherein a portion of meat of the ham is positioned between the first separation and the femur bone.

* * * * *